United States Patent [19]

Onodera et al.

[11] Patent Number: 4,621,717
[45] Date of Patent: Nov. 11, 1986

[54] WHEEL HUB CLUTCH ASSEMBLY

[75] Inventors: Takayoshi Onodera, Toyota; Toru Kagata, Kariya, both of Japan

[73] Assignees: Toyota Jidosha Kabushiki Kaisha, Toyota; Aisin Seiki Kabushiki Kaisha, Kariya, both of Japan

[21] Appl. No.: 643,734

[22] Filed: Aug. 24, 1984

[30] Foreign Application Priority Data

Aug. 26, 1983 [JP] Japan ................................ 58-156635

[51] Int. Cl.$^4$ ............................................ F16D 11/10
[52] U.S. Cl. ...................................... 192/36; 192/54; 192/93 A
[58] Field of Search .............. 192/36, 67 R, 54, 93 A, 192/35

[56] References Cited

U.S. PATENT DOCUMENTS 4,163,486  8/1979  Kagata ................................. 403/1 X
4,269,294  5/1981  Kelbel ............................ 192/67 R X
4,281,749  8/1981  Fogielberg ............................. 192/36

Primary Examiner—George H. Krizmanich
Attorney, Agent, or Firm—Oblon, Fisher, Spivak, McClelland & Maier

[57] ABSTRACT

A wheel hub clutch assembly which includes a cylindrical body attached to a wheel hub, an inner sleeve contained within the body and fixedly mounted on a driveable axle, a clutch member splined to the inner sleeve to be maintained in a first position in which external splining of the clutch member is disengaged from internal splining of the body to uncouple the wheel hub from the axle and to be axially moved from the first position to a second position in which the external splining is engaged with the internal splining to couple the wheel hub to the axle, a cam ring formed at one side thereof with a cam face and rotatable on the inner sleeve, a cam follower splined to the inner sleeve between the clutch member and the cam ring to cooperate with the cam face of the cam ring to be moved to and from the clutch member in response to rotation of the inner sleeve, and a return spring for loading the cam follower toward the cam face of the cam ring, wherein the cam follower is operatively connected to the clutch member, and the cam ring is arranged to be applied with the brake in response to rotation of the cam follower. In the clutch assembly, the cam face of the cam ring is improved to reliably effect complete disengagement of the external splining of the clutch member from the internal splining of the body in declutching operation.

3 Claims, 11 Drawing Figures

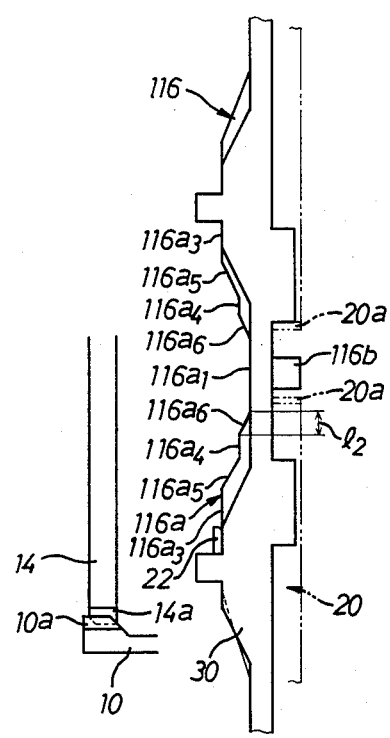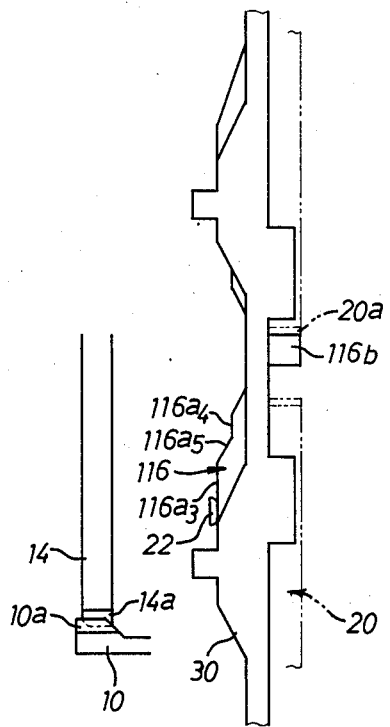

Fig.10
Fig.11
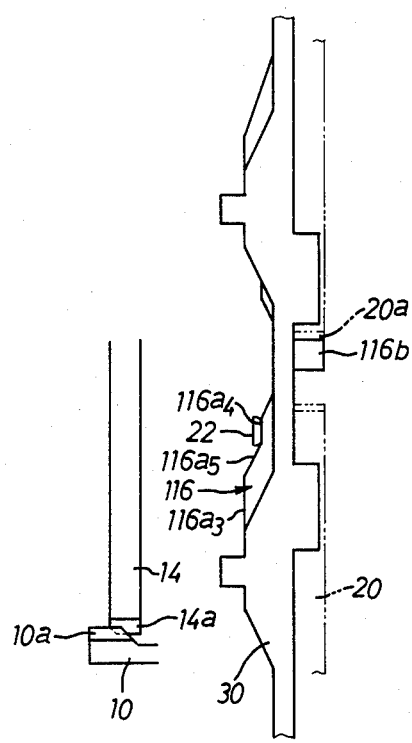
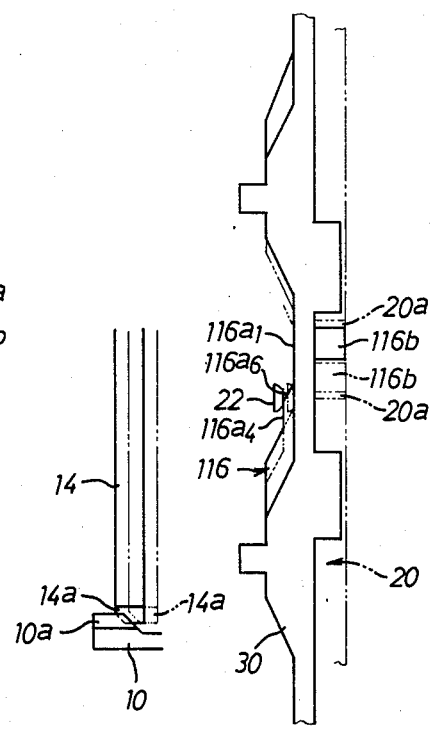

WHEEL HUB CLUTCH ASSEMBLY

BACKGROUND OF THE INVENTION

1. Field of the Invention

The present invention relates to a wheel hub clutch assembly for automotive vehicles of the four-wheel drive type, and more particularly to an improvement of a wheel hub clutch assembly arranged to automatically couple and uncouple a wheel hub to and from a driveable axle so as to selectively provide four-wheel drive or two-wheel drive.

2. Description of the Prior Art

Such a wheel hub clutch assembly as described above comprises a cylindrical body provided therein with internal splining and attached to a wheel hub, an inner sleeve contained within the cylindrical body and fixedly mounted on a driveable axle, a clutch member provided thereon with external splining and splined to the inner sleeve so as to be maintained in a first position in which the external splining of the clutch member is disengaged from the internal splining of the body to uncouple the wheel hub from the axle and to be axially moved from the first position to a second position in which the external splining of the clutch member is engaged with the internal splining of the body to drivingly couple the wheel hub to the axle, a cam ring formed at one side thereof with a cam face and rotatably mounted on the inner sleeve, a cam follower arranged between the clutch member and the cam ring and splined to the inner sleeve to cooperate with the cam face of the cam ring to be axially moved to and from the clutch member in response to rotation of the inner sleeve, a return spring for loading the cam follower toward the cam face of the cam ring, means for connecting the cam follower with the clutch member, and means for applying the brake to the cam ring in response to rotation of the cam follower. For actual practice of the wheel hub clutch assembly, various tests and experiments have been conducted by the inventors. In these tests and experiments, it has been observed that damage of the splining teeth or meshing noises is caused by incomplete disengagement of the clutch member from the body in declutching operation of the assembly.

SUMMARY OF THE INVENTION

It is, therefore, a primary object of this invention to provide a wheel hub clutch assembly the cam ring of which is improved to reliably effect complete disengagement of the external splining of the clutch member from the internal splining of the body in declutching operation.

According to this invention, the object is accomplished by providing a wheel hub clutch assembly the cam ring of which is formed at one side thereof with a cam face including a flat valley portion for receiving thereon the cam follower to maintain the clutch member in its disengaged position, a first slope portion extending circumferentially and axially outwardly from the flat valley portion to effect axial movement of the cam follower toward the clutch member by engagement with the cam follower, an intermediate flat portion extending from the first slope portion for receiving thereon the cam follower to maintain the external splining of the clutch member in engagement with the internal splining of the body, a second slope portion extending circumferentially and axially outwardly from the intermediate flat portion to effect further axial movement of the cam follower toward the clutch member by engagement with the cam follower, and a flat ridge portion extending circumferentially from the second slope portion for receiving thereon the cam follower to effect engagement of the external splining of the clutch member with the internal splining of the body.

BRIEF DESCRIPTION OF THE DRAWINGS

Additional objects and advantages of the present invention will become readily apparent from the following detailed description of a preferred embodiment thereof when taken together with the accompanying drawings, in which:

FIGS. 3–6 partly illustrate a cam portion of a conventional cam ring and part of the associated cam follower in the wheel hub clutch assembly, in which FIGS. 3–5 illustrate relative position of the cam ring and the cam follower in clutching operation of the clutch assembly, and FIGS. 6 and 7 illustrate the relative positions of the cam ring and the cam follower in declutching operation of the clutch assembly; and FIGS. 8–11 partly illustrate a cam portion of an improved cam ring according to the present invention and part of the associated cam follower and illustrate the relative positions of the improved cam ring and the cam follower in declutching operation of the clutch assembly.

DESCRIPTION OF THE PREFERRED EMBODIMENT

Figure 1:
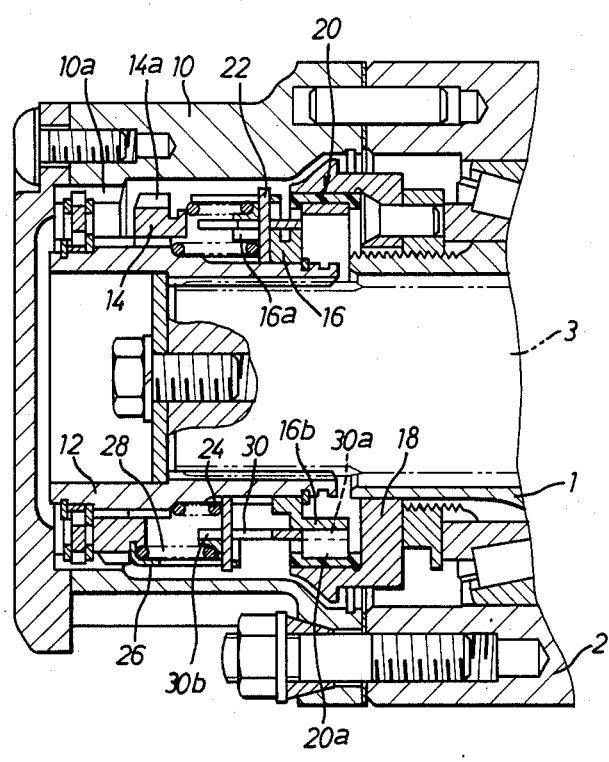
FIG. 1 is a sectional view of a wheel hub clutch assembly to be improved by the present invention.
Figure 2:
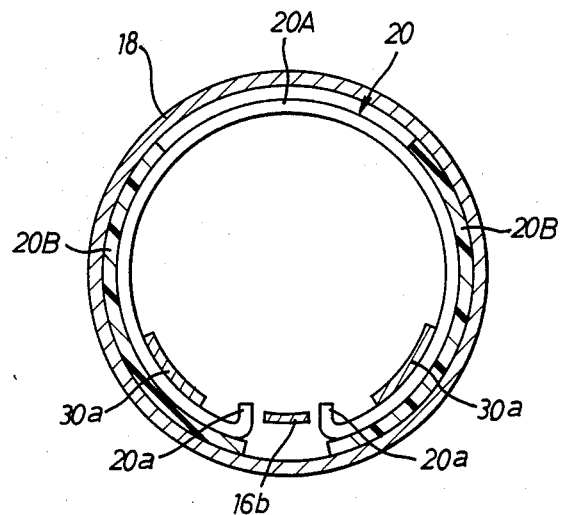
FIG. 2 is a cross-sectional view illustrating an arrangement of a band brake assembly in relation to axial projections of a cam ring and a slide ring of the wheel hub clutch assembly shown in FIG. 1.
Figure 3:
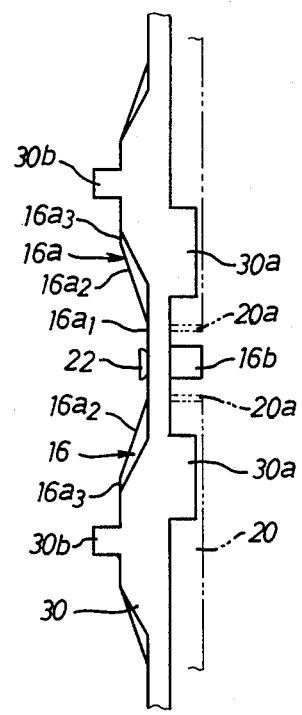
Figure 4:
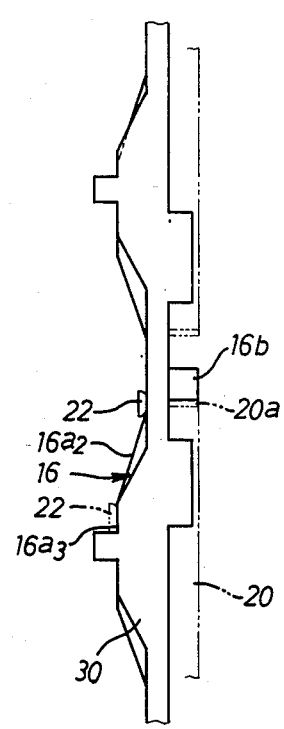

Referring now to the attached drawings, a preferred embodiment of the present invention is described in contrast with a conventional embodiment. For a better understanding, a preferred embodiment of a prior art wheel hub clutch assembly is described in detail with reference to FIGS. 1–7 of the drawings. As illustrated in FIGS. 1–3, the prior art wheel hub clutch assembly includes a cylindrical body 10 secured to a wheel hub 2 which is rotatably mounted on the outer end of an axle tube 1 by means of a tapered roller bearing in a usual manner. The wheel hub clutch assembly further comprises an inner sleeve 12 contained within the cylindrical body 10 and fixed to the outer end of a driveable axle 3 by means of a spline connection, an annular clutch member 14 axially slidably splined to the inner sleeve 12 for transmission of a driving torque from the axle 3 to the wheel hub 2, a cam ring 16 rotatably mounted on the inner sleeve 12, a brake drum 18 fixed to the axle tube 1 by means of fastening bolts, a band brake assembly 20 contained within the brake drum 18, an annular cam follower 22 arranged between the cam ring 16 and clutch member 14 and axially slidably splined to the inner sleeve 12 for rotation therewith, an inner coil spring or return spring 24 engaged at its one end with an annular shoulder of inner sleeve 12 for loading the cam follower 22 toward the cam ring 16, a connecting assembly including an annular joint member 26 hooked at its opposite ends on the clutch member 14 and cam follower 22 and an outer coil spring 28 interposed between the cam follower 22 and clutch member 14, and a slide ring 30 rotatably coupled over the cam ring 16.

The clutch member 14 is integrally formed with external teeth or splining 14a which are arranged to be brought into engagement with internal teeth or splining 10a of the cylindrical body 10 in clutching operation. As can be well seen in FIG. 3, the cam ring 16 is formed at its leftside with a cam face 16a which includes a flat valley portion $16a_1$, a pair of slope portions $16a_2$ extending circumferentially and axially outwardly from the opposite ends of valley portion $16a_1$, and a pair of flat ridge portions $16a_3$ extending circumferentially from the respective slope portions $16a_2$. The cam ring 16 is further formed at its rightside with an axial projection 16b. As can be well seen in FIG. 2, the band brake assembly 20 includes an annular leaf spring 20A and a pair of brake shoes 20B secured to the outer periphery of leaf spring 20A. The annular leaf spring 20A has a pair of circumferentially spaced radial lugs 20a, 20a which are arranged to be brought into engagement with the axial projection 16b of cam ring 16 in rotation of the cam ring 16. When engaged with the axial projection 16b of cam ring 16, the band brake assembly 20 cooperates with the brake drum 18 to cause a drag torque. The cam follower 22 is arranged to be axially moved toward the clutch member 14 by engagement with one of the slope portions $16a_2$ of cam ring 16 in response to initial rotation of the axle 3. The slide ring 30 is formed at its rightside with a pair of circumferentially spaced axial projections 30a, 30a to be brought into engagement with one of the radial lugs 20a of band brake assembly 20. The slide ring 30 is further formed at its leftside with a pair of circumferentially spaced axial projections 30b, 30b which are located outside of the cam face 16a of cam ring 16.

Figure 5:
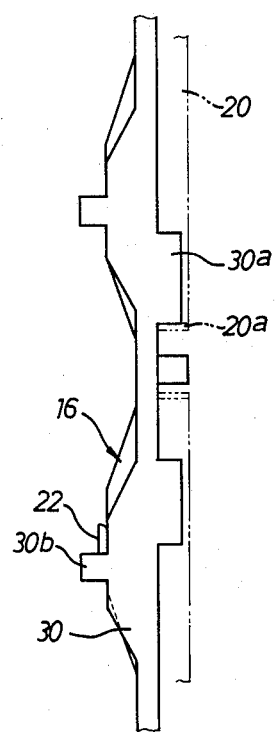
Figure 6:
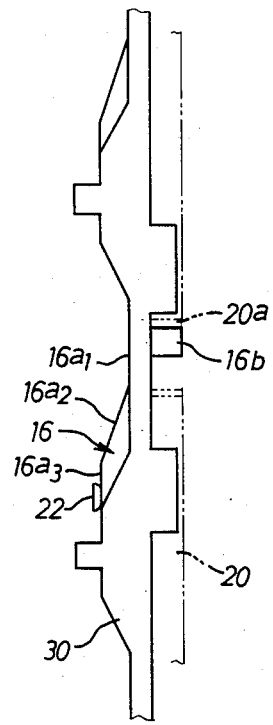

When the axle 3 is driven by a prime mover of the vehicle, the cam follower 22 is integrally rotated with the inner sleeve 12 in response to initial rotation of the axle 3, and in turn, the cam ring 16 is rotated by engagement with the cam follower 22 at its slope portion $16a_2$. Subsequently, the axial projection 16b of cam ring 16 abuts against one of the radial lugs 20a of band brake assembly 20 to apply the brake to the cam ring 16. As a result, the cam follower 22 is rotated relatively to the cam ring 16 and is moved axially outwardly toward the clutch member 14 by engagement with the slope portion $16a_2$ of cam ring 16 under the loading of return spring 24. Thus, as is illustrated by an imaginary line in FIG. 4, the cam follower 22 is brought into engagement with the flat ridge portion $16a_3$ of cam ring 16 and supported in place. Such axial movement of the cam follower 22 is transmitted to the clutch member 14 through the spring 28 such that the clutch member 14 is pushed axially outwardly to engage the internal splining 10a of body 10 at its external splining 14a, as illustrated by a lower half of FIG. 1. Thus, the inner sleeve 12 is coupled to the cylindrical body 10 to drivingly connect the wheel hub 2 with the axle 3. During such clutching operation as described above, the cam follower 22 is brought into engagement with one of the axial projections 30b of slide ring 30. Thus, as is illustrated in FIG. 5, the slide ring 30 is rotated by the cam follower 22 and abuts against the other radial lug 20a of band brake assembly 20 at its axial projection 30a to reduce the diameter of leaf spring 20A thereby to disengage the brake shoes 20B from the brake drum 18.

To uncouple the inner sleeve 12 from the cylindrical body 10, the axle 3 is conditioned in a usual manner to be free from the prime mover of the vehicle, and the vehicle is slightly moved rearwards by two-wheel drive operation to effect reverse rotation of the wheel hub 2. As a result, the inner sleeve 12 is rotated by the wheel hub 2 through the clutch member 14 to effect reverse rotation of the cam follower 22. Subsequently, the cam ring 16 is rotated by engagement with the cam follower 22 under the loading of return spring 24 and abuts against the other radial lug 20a of band brake assembly 20 at its axial projection 16b to be applied with the brake. (see FIG. 6) Thus, the cam follower 22 is further rotated relative to the cam ring 16 in the reverse direction and is brought into engagement with the valley portion $16a_1$ of cam ring 16 under the loading of return spring 24. Simultaneously, the clutch member 14 is moved axially inwardly by the cam follower 22 through the joint member 26 to disengage the external splining 14a of clutch member 14 from the internal splining 10a of cylindrical body 10.

Figure 7:
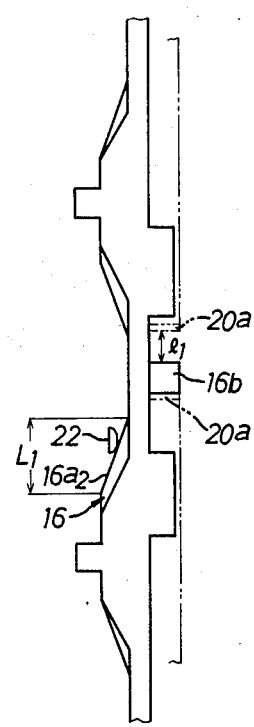

In actual practice of the prior art wheel hub clutch assembly, as is illustrated in FIG. 7, the circumferential length $L_1$ of the slope portion $16a_2$ of cam ring 16 has been determined to be longer than the circumferential distance $l_1$ between the axial projection 16b of cam ring 16 and the radial lug 20a of leaf spring 20A. For this reason, it has been observed that when the cam follower 22 is brought into engagement with the slope portion $16a_2$ of cam ring 16 in declutching operation of the clutch assembly, the cam ring 16 is applied with the biasing force of return spring 24 in its circumferential direction. In such a condition, the cam ring 16 is temporarily returned to rest the cam follower 22 in an intermediate position of the slope portion $16a_2$ of cam ring 16. (see FIG. 7) This results in incomplete disengagement of the external splining 14a of clutch member 14 from the internal splining 10a of body 10, thus causing damage of the splining teeth 10a and 14a or unpleasant meshing noises in the wheel hub clutch assembly after declutched.

Referring now to FIGS. 8–11 of the attached drawings, there is illustrated an improved cam ring 116 in accordance with the present invention which is associated with the cam follower 22 of the wheel hub clutch assembly illustrated in FIGS. 1 and 2. A cam face 116a of cam ring 116 is formed with a pair of intermediate flat portions $116a_4$ which are respectively located between first and second slope portions $116a_6$ and $116a_5$ of the cam face 116a. The other cam portions $116a_1$ and $116a_3$ of cam ring 116 correspond respectively with the valley portion $16a_1$ and the flat ridge portions $16a_3$ of cam ring 16 previously described with reference to FIGS. 3–7. The first and second slope portions $116a_6$ and $116a_5$ of cam ring 116 correspond with the slope portion $16a_2$ of cam ring 16. In this arrangement, each of the intermediate flat portions $116a_4$ is circumferentially spaced in by a distance $l_2$ from the opposite ends of the flat valley portion $116a_1$, and the distance $l_2$ is substantially the same as the distance $l_1$ between the axial projection 16b of cam ring 16 and the radial lug 20a of leaf spring 20A previously described with reference to FIG. 7. When the cam follower 22 is in engagement with one of the intermediate flat portions $116a_4$ of cam ring 116, the external splining 14a of clutch member 14 is still in engagement with the internal splining 10a of body 10. (see FIG. 10) The other compoment parts and portions are substantially the same as those of the prior art wheel hub clutch assembly.

In declutching operation of the wheel hub clutch assembly equipped with the improved cam ring 116, the axle 3 is conditioned to be free from the prime mover of the vehicle after four-wheel operation and the vehicle is slightly moved rearwards by two-wheel drive to effect reverse rotation of the wheel hub 2. Thus, the inner sleeve 12 is rotated by the wheel hub 2 through the clutch member 14 to effect reverse rotation of the cam follower 22, and in turn, the cam ring 116 is rotated by engagement with the cam follower 22 under the loading of return spring 24 and abuts against the radial lug 20a of band brake assembly 20 at its axial projection 116b to apply the brake to the cam ring 116, as is illustrated in FIG. 9. Subsequently, the cam follower 22 is further rotated relatively to the cam ring 116 in the reverse direction and is brought into engagement with the intermediate flat portion $116a_4$ of cam ring 116 via the second slope portion $116a_5$, as is illustrated in FIG. 10. Under such a condition, the cam follower 22 is moved axially inwardly by return spring 24, but the external splining 14a of clutch member 14 is still in engagement with the internal splining 10a of body 10 in spite of axially inward movement of the clutch member 14. Even if the cam ring 116 is returned by engagement with the cam follower 22 at its second slope portion $116a_5$ under the loading of return spring 24, the cam follower 22 will be rotated in the reverse direction to engage the intermediate flat portion $116a_4$ of cam ring 116, since the external splining 14a of clutch member 14 is still in engagement with the internal splining 10a of body 10 to rotate the cam follower 22.

When the cam follower 22 is further rotated in the reverse direction, it is brought into engagement with the following first slope portion $116a_6$ of cam ring 116 under the loading of return spring 24. Under such a condition, as is illustrated by an imaginary line in FIG. 11, the cam ring 116 is returned by the circumferential biasing force of spring 24 acting thereon so that the cam follower 22 is brought into engagement with the flat valley portion $116a_1$ of cam ring 116. Simultaneously, the clutch member 14 is further moved axially inwardly by the cam follower 22 through the joint member 26. Thus, the external splining 14a of clutch member 14 is completely disengaged from the internal splining 10a of cylindrical body 10 to avoid damage of the splining teeth 10a and 14a and unpleasant meshing noises generated by the same.

Although in the above embodiment, the intermediate flat portions $116a_4$ of cam ring 116 are respectively spaced by the distance $l_2$ from the opposite ends of flat valley portion $116a_1$, the space between the valley and intermediate portions $116a_1$ and $116a_4$ may be smaller than the distance $l_1$. In actual practice, the present invention may be adapted to a wheel hub clutch assembly in which the band brake assembly 20 is arranged in surrounding relationship with the brake drum. Alternatively, the present invention may be adapted to a wheel hub clutch assembly without the slide ring 30.

Having now fully set forth both structure and operation of a preferred embodiment of the concept underlying the present invention, various other embodiments as well as certain modifications of the embodiment herein shown and described will obviously occur to those skilled in the art upon becoming familiar with said underlying concept. It is, therefore, to be understood that within the scope of the appended claims, the invention may be practiced otherwise than as specifically set forth herein.

What is claimed is:

1. A wheel hub clutch assembly, comprising:

a cylindrical body provided therein with internal splining and to be attached to a wheel hub for rotation therewith;

an inner sleeve contained within said cylindrical body to be fixedly mounted on a driveable axle for rotation therewith;

a clutch member provided thereon with external splining and splined to said inner sleeve to be maintained in a first position in which the external splining of said clutch member is disengaged from the internal splining of said body to uncouple said wheel hub from said axle and to be axially moved from the first position to a second position in which the external splining of said clutch member is engaged with the internal splining of said body to drivingly couple said wheel hub to said axle;

a cam ring formed at one side thereof with a cam face and rotatably mounted on said inner sleeve;

a cam follower arranged between said clutch member and said cam ring and splined to said inner sleeve to cooperate with the cam face of said cam ring to be axially moved toward and away from said clutch member in response to rotation of said inner sleeve;

a return spring for loading said cam follower toward the cam face of said cam ring;

means for connecting said cam follower with said clutch member; and means for applying a braking force to said cam ring in response to rotation of said cam follower;

wherein the cam face of said cam ring includes:

a valley portion for receiving thereon said cam follower to maintain said clutch member in the first position, a first slope portion extending circumferentially and axially outwardly from said valley portion to effect axial movement of said cam follower toward said clutch member by engagement with said cam follower, an intermediate flat portion extending circumferentially from said first slope portion for receiving thereon said cam follower to effect and maintain engagement of the external splining of said clutch member with the internal splining of said body, a second slope portion extending circumferentially and axially outwardly from said intermediate flat portion to effect further axial movement of said cam follower toward said clutch member by engagement with said cam follower, and a flat ridge portion extending circumferentially from said second slope portion for receiving thereon said cam follower to complete engagement of the external splining of said clutch member with the internal splining of said body.

2. A wheel hub clutch assembly as claimed in claim 1, wherein said valley portion of said cam face is in the form of a flat valley portion, and said intermediate flat portion of said cam face is circumferentially spaced in a predetermined distance from one end of said flat valley portion.

3. A wheel hub clutch assembly as claimed in claim 1, wherein said means for applying the brake to said cam ring comprises a brake drum fixed to an axle tube in surrounding relationship with said axle, an annular leaf spring contained within said brake drum and formed with a pair of circumferentially spaced radial lugs to be engaged with an axial projection of said cam ring, and a brake shoe secured to the outer periphery of said leaf spring to cause a drag torqrue by engagement with said brake drum, and wherein the distance between said valley and intermediate flat portions of said cam face is substantially the same as the distance between one of said radial lugs and the axial projection of said cam ring.

* * * * *